United States Patent
Akella et al.

(10) Patent No.: US 10,009,227 B2
(45) Date of Patent: Jun. 26, 2018

(54) NETWORK SERVICE PROVISIONING TOOL AND METHOD

(71) Applicant: Bank of America Corporation, Charlotte, NC (US)

(72) Inventors: Seshu Kumar Akella, Hyderabad (IN); Sasidhar Purushothaman, Manikonda (IN); Muthusamy Periyasamy, Gajularamaram (IN); Sridhar Goruganti, Madinaguda (IN)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 15/044,525

(22) Filed: Feb. 16, 2016

(65) Prior Publication Data
US 2017/0237616 A1 Aug. 17, 2017

(51) Int. Cl.
| | |
|---|---|
| G06F 3/0484 | (2013.01) |
| H04L 12/24 | (2006.01) |
| G06F 3/0481 | (2013.01) |
| G06F 17/24 | (2006.01) |
| H04L 12/26 | (2006.01) |

(52) U.S. Cl.
CPC ........ H04L 41/0823 (2013.01); G06F 3/0481 (2013.01); G06F 3/04842 (2013.01); G06F 17/248 (2013.01); H04L 41/0843 (2013.01); H04L 43/10 (2013.01)

(58) Field of Classification Search
None
See application file for complete search history.

(56) References Cited

U.S. PATENT DOCUMENTS

| | | | |
|---|---|---|---|
| 8,484,355 B1 * | 7/2013 | Lochhead | H04L 41/0806 709/222 |
| 2008/0201711 A1 | 8/2008 | Husain | |
| 2011/0213885 A1 * | 9/2011 | Kelkar | G06F 9/5072 709/226 |
| 2011/0214010 A1 | 9/2011 | Aggarwal et al. | |
| 2011/0321033 A1 | 12/2011 | Kelkar et al. | |
| 2012/0297069 A1 | 11/2012 | Duchastel et al. | |
| 2013/0130651 A1 * | 5/2013 | Deasy | H04W 76/10 455/411 |

* cited by examiner

*Primary Examiner* — Tuan S Nguyen
(74) *Attorney, Agent, or Firm* — Banner & Witcoff, Ltd.; Michael A. Springs (57) ABSTRACT

A network service provisioning system may generate a data structure for configuring hardware and implementing an information system based on user responses to dynamically branching prompts. The provisioning system may generate an initial process map for the information system based on the user's responses and a determined information processing task. As described further herein, the provisioning system may break the initial process map into one or more sub-processes and proceed to individually optimize the sub-processes utilizing parallel process on a plurality of worker nodes. The provisioning system may apply a master template based to the intermediate process map to generate one or more optimization recommendations for the intermediate process map. Once a final optimized process map is generated by the provisioning system, the provisioning system may provide the optimized process map to an automatic orchestrator system for configuring and implementing the information system represented by the optimized process map.

20 Claims, 8 Drawing Sheets

NETWORK SERVICE PROVISIONING TOOL AND METHOD

BACKGROUND

Aspects of the disclosure relate to computer hardware and software. In particular, one or more aspects of the disclosure generally relate to provisioning and configuring network services and information systems responsive to use parameters.

In modern commerce, information is acquired, processed, and maintained in a wide variety of contexts. Each context may involve many different information processing tasks and workflows. These disparate information processing tasks are often best solved using network services and information systems specially configured to the particular tasks involved. Although many similar architectures may be employed for related problems, the particular nature of each information processing task may lead to particular optimizations that may be made to a base architecture. Such optimizations may lead to improved efficiency, speed, and accuracy of results. Furthermore, certain contexts and information processing tasks may necessitate particular processing steps that are otherwise not included in a base workflow applicable to generic information processing tasks. Additionally, certain contexts and information processing tasks may be subject to regulation and/or other oversight, and a complete information system designed to address the particular context and/or information processing task may incorporate features designed to ensure compliance with applicable regulations.

Design, configuration, and implementation of network services and information systems for solving information processing tasks has traditionally been the purview of experienced Information Technology managers and engineers. Provisioning servers and systems that fulfill technical, regulatory, and other compliance requirements has been a complex problem. Manual design and implementation of information services including controls and review processes would frequently result in problems including improper system configurations, non-compliance with applicable regulations, inappropriate access controls, and other problems. Further, as electronic data and network services have become an indispensable aspect of modern commerce, non-technical users themselves are increasingly seeking to provision specially configured network services and information systems to solve information processing tasks in a variety of contexts.

SUMMARY

Aspects of the disclosure relate to various systems and techniques that facilitate provisioning and configuring network services and information systems responsive to use parameters. In particular, some aspects of the disclosure provide a network service provisioning system that gathers use parameters based on user input and generates an optimized process map for automatic implementation of a network service and/or information system adapted to the particular needs of the user.

According to some aspects, a network service provisioning system may present a series of dynamically branching user prompts to a user to gather use parameters for the information system. The dynamically branching user prompts may be presented as a questionnaire via a user interface generated by the provisioning system that requests information associated with the operation and configuration of the information system, and may prompt the user to answer a set of questions relating to a process baseline, a process classification, technical features and entities, regulatory requirements, and/or process monitoring controls, for example. Based on the user's responses to the prompts, the provisioning system may determine an information processing task for the information system. One or more of the user's responses to the user prompts may be determined to indicate that the information system should be configured to carry out a particular information processing task.

The provisioning system may generate an initial process map for the information system based on the user's responses and the determined information processing task. The initial process map may be based on a template associated with the information processing task. As described further herein, the provisioning system may break the initial process map into one or more sub-processes and proceed to individually optimize the sub-processes by, for example, identifying and removing/adjusting redundant, unnecessary, or inefficient entities and/or entity relationships. Individual sub-processes may be distributed to worker nodes and optimized using parallel processing. Optimized sub-processes may be combined to generate an intermediate process map representing an optimal solution determined by the optimization procedure.

The provisioning system may apply a master template to the intermediate process map to generate one or more optimization recommendations for the intermediate process map. The master template may be based on best-practices, regulations, and/or other policies associated with the information processing task. For example, application of the master template to the intermediate process map may generate a recommendation that additional steps, entities, and/or entity relationships be added to the process map to comply with best practices and regulations. Entities, steps, and/or entity relationships may be added, removed, and/or adjusted based on information included in the master template.

The optimization recommendations may be presented to a user for selection in a final optimized process map. Additionally or alternatively, one or more of the optimization recommendations may be automatically implemented based on rules and/or criteria included in data associated with the master template. Once a final optimized process map is generated by the provisioning system, the provisioning system may provide the optimized process map to an automatic orchestrator system for configuring and implementing the information system represented by the optimized process map.

By leveraging various aspects of these techniques and/or the other features and functionalities discussed in greater detail below, users may be provided with specially configured network services and information systems responsive to identified needs. One or more aspects described herein may provide a technical solution to the problems inherent in manual design of information systems, including improper system configurations, non-compliance with applicable regulations, inappropriate access controls, and other problems. Aspects described herein may provide a technical solution to these and other problems through use of a special purpose computer system to dynamically gather use parameters, compute optimal entity relationships in a process map (which may be implemented using parallel processing), update and modify the process map based on stored technical and regulatory standards, and automatically implement at least a portion of the information system based on the optimized process map. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects of the disclosure relate to various systems and techniques that facilitate provisioning and configuring network services and information systems responsive to use parameters. In particular, some aspects of the disclosure provide a network service provisioning system that gathers use parameters based on user input and generates an optimized process map for automatic implementation of a network service and/or information system adapted to the particular needs of the user.

Process maps may be generated and visualized by a provisioning system to provide users with a visual representation of the operation and structure of an information system. A process map may comprise one or more entities and one or more entity relationships between the entities. Entities may correspond to hardware, software, and/or user entities and may have one or more attributes associated therewith. Attributes may include any suitable criteria to describe the role, operation, and/or requirements associated with the entity. For example, attributes may describe a function of the entity, an identifier of the entity, a capability of the entity, a hardware loadout of the entity, input/output requirements of the entity, costs associated with the entity, and/or any other suitable attributes of an entity. Entity relationships may describe one or more interactions between entities in the process map. For example, entity relationships may describe dependencies among entities, data flow between entities, control of one entity by another, and/or any other suitable relationship between entities. Process maps may be usable by an automatic orchestration system to automatically configure and implement the information system in the manner specified in the process map.

Some aspects described herein may provide a network service provisioning system configured to automatically generate a process map representing an optimal configuration for an information system based on user responses to prompts regarding goals and requirements for the information system. The provisioning system may be configured to generate a user interface comprising a plurality of dynamically branching user prompts. Each of the dynamically branching user prompts may request information associated with operation and configuration of an information system. User responses to the prompts may be used to determine an information processing task for the information system. The provisioning system may generate an initial process map comprising a first plurality of entities and a first plurality of entity relationships based on the plurality of responses and the information processing task. The initial process map may be broken down into a plurality of sub-processes, and each sub-process of the plurality of sub-processes may be associated with one or more entities of the first plurality of entities. The provisioning system may generate an intermediate process map comprising a second plurality of entities and a second plurality of entity relationships based on optimizing each sub-process of the plurality of sub-processes. The provisioning system may apply a master template to the intermediate process map to generate a set of optimization recommendations. The master template may incorporate constraints and standards associated with the information processing task and the plurality of responses. The provisioning system may generate an optimized process map comprising a third plurality of entities and a third plurality of entity relationships based on user input selecting one or more optimization recommendations from the set of optimization recommendations and the intermediate process map. The optimized process map may be provided by the provisioning system to an automated orchestrator for implementation and configuration of the information system.

According to some aspects, a network service provisioning system may present a series of dynamically branching user prompts to a user to gather use parameters for the information system. The dynamically branching user prompts may be presented as a questionnaire via a user interface generated by the provisioning system that requests information associated with the operation and configuration of the information system, and may prompt the user to answer a set of questions relating to a process baseline, a process classification, technical features and entities, regulatory requirements, and/or process monitoring controls, for example. Based on the user's responses to the prompts, the provisioning system may determine an information processing task for the information system. One or more of the user's responses to the user prompts may be determined to indicate that the information system should be configured to carry out a particular information processing task.

Figure 1:
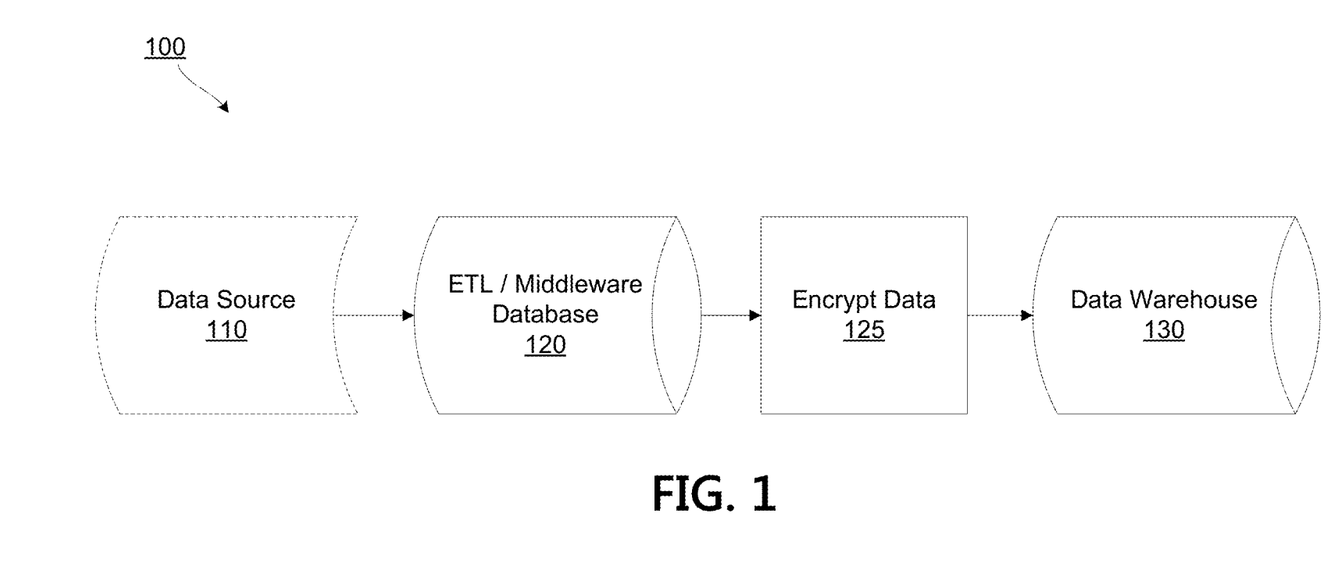
FIGS. 1-3 illustrate an example information system and corresponding process map before and after optimization, according to some aspects described herein.
Figure 2:
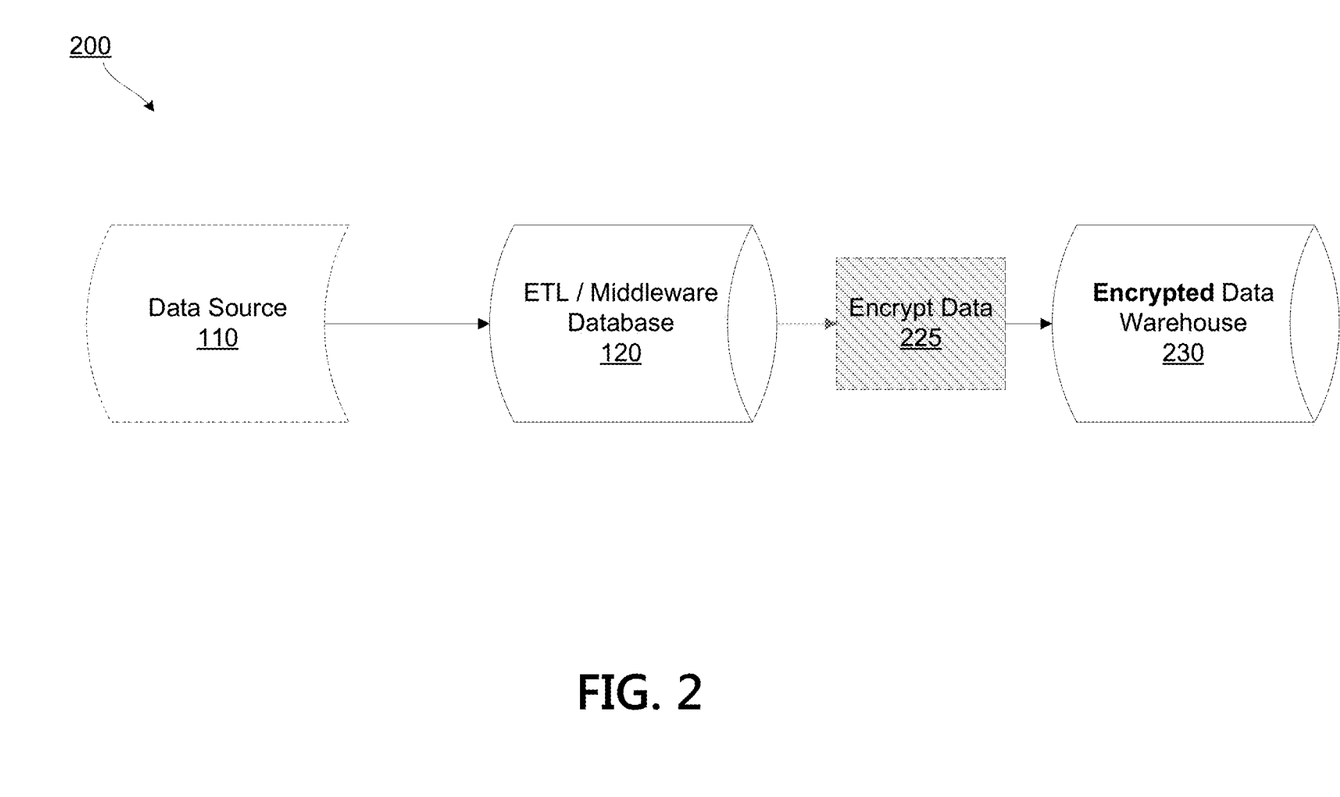
Figure 3:
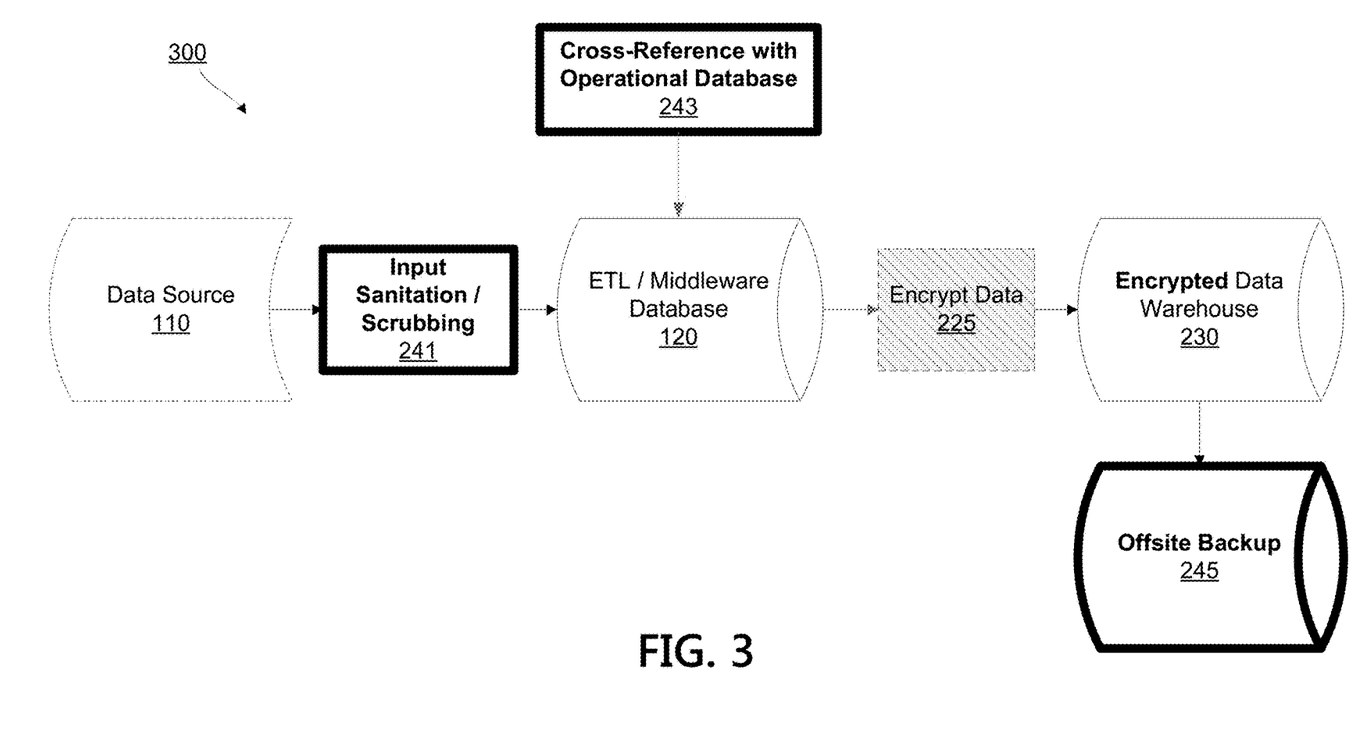

FIGS. 1-3 illustrate an example information system design and optimization thereof responsive to user responses indicating that the information system is intended to handle intake and processing of a large number of sensitive customer records. Consider, as one example, where the user would like to create an information system specially configured to handle customer record data coming in from a data source (e.g. a website). The provisioning system, according to some aspects described herein, may prompt the user to describe the use parameters and goals for the information system. The user may answer that the system is intended for big data and record processing. The user may also answer questions about the hardware available for use in the information system, such as by providing the processing and storage capabilities of one or more servers for use in implementing the system. The optimization system may further prompt the user to answer questions about the nature of the data and identify applicable best practices and regulations, such as that the data includes sensitive customer identifying information and applicable laws require that the data be encrypted prior to storage.

FIG. 1 illustrates an example visualization of an initial process map 100 that may be generated by the provisioning system responsive to the sample user responses described above. The provisioning system, in the example of FIG. 1, may determine from the user responses that a goal for the information system is to create a workflow wherein record information from a data source 110 is processed and securely stored in a data warehouse 130. The provisioning system may determine that an information processing task associated with the particular information system is record processing in a big data environment. The network service provisioning system may generate an initial process map 100 including an initial set of entities having an initial set of entity relationships between them based on user's responses to the user prompts and the determined information processing task for the information system.

In some embodiments, the network provisioning system may include an initial process map template database associating each of a plurality of information processing tasks with a respective initial template. The provisioning system may reference the initial process map template database to access a process map template associated with the information processing task, such as the example task of record processing in a big data environment. The initial templates may be process dies and may be structured to include features and workflows common to a particular class of information processing tasks. According to some aspects, the initial process map template database may store many different process map templates associated with a wide range of information processing tasks, at varying levels of detail. For example, the initial process map template database may store a generic big data process map template, a sensitive-data big data process map template, and a frequent-access big data process map template. Based on the sample user responses, the provisioning system may, for example, determine that the sensitive-data big data process map template is most suitable for the information system due to a user response indicating that the data includes customer identifying data. Continuing the example, the sensitive-data big data process map template may include data source 110, encryption step 125, and data warehouse 130.

The provisioning system may determine, based on the responses and the process map template associated with the information processing task, one or more hardware, software, and/or user entities that may be selected for inclusion in the initial process map based on the template and/or the user's responses, as well as entity relationships between entities selected for inclusion in the initial process map. In the example of FIG. 1, the provisioning server may determine that the initial process map 100 should include the data source 110, an Extract, Transform, and Load (ETL) database 120 and/or middleware database 120, an encryption step 125, and the data warehouse 130. Although in the example the process map template did not include ETL database 120, the provisioning system may determine based on the user responses that the ETL database 120 should be included to properly format information coming in from data source 110. For example, the user responses may indicate that information from data source 110 comprises legacy format data and the provisioning system may identify that such legacy format data is not compatible with data warehouse 130.

Having generated the initial process map 100, the provisioning system may proceed to generate an intermediate process map 200 as visualized in FIG. 2. The intermediate process map 200 may include an intermediate set of entities and an intermediate set of entity relationships between the intermediate entities selected based on the initial set of entities, the initial set of entity relationships, and results from optimizing individual sub-processes associated with initial process map 100. The provisioning system may attempt to optimize the initial process map 100 as described further herein. For example, the provisioning system may iteratively adjust relationships and entities of initial process map 100 and evaluate resulting process maps against one or more optimization criteria. In some implementations, the provisioning system may attempt to optimize the initial process map 100 by discovering a minimal set of entities and/or relationships between the entities. The provisioning system may adjust the nature of the entities in the initial process map 100 and the relationships between the entities to identify a redundant step/entity. In particular, in the example of FIG. 2 the provisioning system may determine that the encryption step 225 is unnecessary if data warehouse 130 is replaced with encrypted data warehouse 230. The provisioning system may determine the encryption step 225 to be unnecessary based on adjusting the relationships such that data from the ETL database 120 bypasses the encryption step and goes directly to encrypted data warehouse 230. The provisioning system may store one or more rules and/or other criteria that, for example, include identification of candidate replacement entities for a given entity (such as using encrypted data warehouse 230 in place of data warehouse 130).

The optimization process may be implemented using any suitable optimization algorithm adapted to process and optimize process maps as described herein. Optimization may involve assessing the suitability of the entities associated with the sub-process and relationships between those entities. Suitable optimization algorithms may generate optimal solutions and/or reasonable approximations of an optimal solution that accomplish a task handled by the process/sub-process (such as where stop criteria and/or confidence levels are used to prevent an exhaustive search). Optimization algorithms may iteratively adjust entity relationships and/or entities in the process map and may evaluate the resulting process maps based on optimization criteria. Examples of criteria for determining an optimal solution may include criteria based on a number of entities in a solution, a number of relationships in a solution, the nature of entities in a solution, the nature of relationships in a solution, the expected processing loads associated with the solution, the expected storage loads associated with the system, level of compliance with policies, and/or any other suitable metric for evaluating the suitability of a solution for implementation. Some optimization algorithms suitable for implementations may determine a minimal number of entities and/or entity relationships for a given process map while still maintaining an intended function of the information system represented by the process map. Some examples of suitable optimization algorithms may include ant colony optimizations which generate partial search algorithms that yield solutions that are sufficient approximations of the ideal solution; simulated annealing algorithms which may determine an optimum for a given function and may operate on discrete data in a large search space; particle swarm optimization algorithms; and metaheuristic algorithms which attempt to find partial search algorithms that provide sufficient quality solutions.

According to some embodiments described further herein, the process map may be divided into one or more sub-processes for individual optimization. The provisioning system may break the process map down into a set of sub-processes each associated with various subsets of the initial set of entities. The individually optimized sub-processes may be used to generate intermediate process map 200. Individually optimized sub-processes may be combined with other sub-processes for further optimization, such as identifying that both sub processes rely on common entities or common entity relationships and removing the redundant entities and/or entity relationships.

The sub-processes may be distributed to one or more worker nodes operating in parallel to optimize individual sub-processes using parallel processing. A master node, such as a provisioning server of the provisioning system, may control the assignment of the sub-processes to the individual worker nodes and aggregate optimization results returned from the worker nodes. The master node may assign respective sub-processes to the worker nodes and coordinate optimization of the sub-processes by the worker nodes. For example, the master node may provide suitable stop criteria to each of the worker nodes for use in identifying an optimal solution for each sub-process subject to certain specified constraints and tolerances. The master node may receive optimization results from the worker nodes and combine the optimized sub-processes to generate the intermediate process map 200.

The provisioning system may continue searching for an optimized process map until stop criteria is met. For example, the stop criteria may comprise a processing budget that causes the optimization process to stop after a certain amount of processing time and/or computing resources has been utilized by the optimization process. The stop criteria may, as another example, cause the optimization process to be stopped after a set of variations is exhausted. As yet another example, the stop criteria may comprise conditions associated with a particular optimization algorithm selected for a given implementation, such as a confidence rating associated with a metaheuristic problem optimization algorithm. Upon reaching the stop criteria, the provisioning system may select a resulting process map that best meets the optimization criteria as intermediate process map 200.

Having generated intermediate process map 200, the provisioning system may apply a master template to intermediate process map 200 to generate one or more optimization recommendations. The master template may incorporate constraints and standards associated with the information processing tasks identified for the information system by the plurality of responses, as well as constraints and standards indicated by the plurality of responses themselves. Similar to the initial process template, the master template may be a process die and be structured to include features and workflows common to a particular class of information processing tasks. Applying the master template to the intermediate process map may cause the provisioning system to generate recommendations such as the addition of further entities and/or entity relationships to the intermediate process map 200. The master template may indicate additional steps, entities, and/or entity relationships based on a range of constraints and standards spanning technical specifications, engineering standards, information security policies, historical performance data, enterprise policies, enterprise monitoring controls, enterprise process relationships, and/or business controls, among others.

The provisioning system may present one or more optimization recommendations to a user via a graphical user interface, as illustrated in FIG. 3, which includes a visualization of an optimized process map 300. For example, optimized process map 300 may include added steps of input sanitation/input scrubbing 241, a step of cross-referencing an operational database 243, and an offsite backup 245.

Continuing the example, the master template associated with the big data information processing task may indicate that a best practice suggests and/or security policy requires that the data coming in from data source 110 be subject to input sanitation/input scrubbing 241 to remove malformed or malicious data. As another example, the master template may indicate that corporate policy is to cross-reference incoming customer data with an operational database to identify existing customer entities during processing by the ETL database 120. As still another example, the master template may indicate that information technology best practices recommend that important data included in the encrypted data warehouse be backed up in an offsite backup 245.

The provisioning system may provide the user with an option to select desired ones of the optimization recommendations for implementation by the provisioning system. The provisioning system may generate a final optimized process map 300 based on applying the selected optimization recommendations to the intermediate process map 200. The optimized process map 300 may comprise an optimized set of entities and entity relationships based on the intermediate set of entities, the intermediate set of entity relationships, and/or the optimization recommendations. In some embodiments, some of the optimization recommendations generated by the provisioning system may be deemed mandatory by the master template and may be automatically applied to the intermediate process map 200. In some examples, the provisioning server may be configured to automatically select and apply some of the optimization recommendations based on a set of criteria learned by the provisioning system based on prior runs of the provisioning system to generate other information systems.

The optimized process map 300 incorporating the selected optimization recommendations may be presented to a user and/or provided to an automated orchestrator system configured to automatically implement the information system using the optimized set of entities and optimized set of entity relationships of the optimized process map. The automated orchestrator may take the optimized process map 300 as input and configure suitable hardware to perform the information processing task associated with the information system. Entity relationships of the optimized process map 300 may be used by the automated orchestrator to set-up or configure relationships between hardware and/or software entities determined for inclusion in the information system. For example, the automated orchestrator may configure network elements in a pool of resources for use in the information system based on information included in the optimized process map 300.

Figure 4:
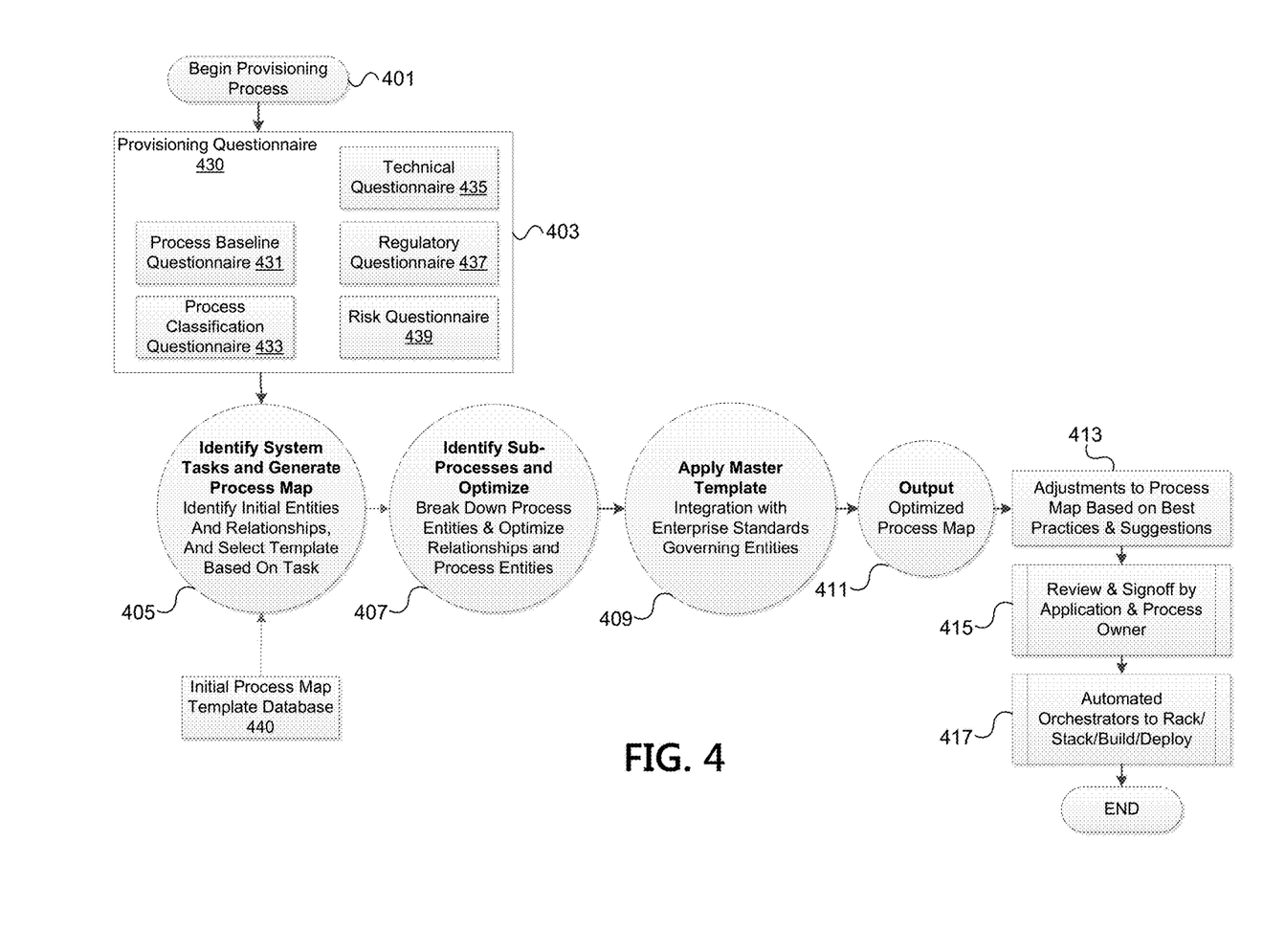
FIG. 4 illustrates an example process optimization workflow according to some aspects described herein.

Having discussed an example of an information processing system and how such a system could be optimized based on best practices, constraints, and standards, as shown in FIGS. 1-3, discussion will now turn to an example process optimization workflow according to one or more aspects described herein as shown in FIG. 4. The process optimization workflow illustrated in FIG. 4 may be implemented at least in part by a special purpose computing device such as a network service provisioning server, which may comprise one or more processors and memory storing instructions for execution by the one or more processors.

At step 401, a provisioning system may begin the provisioning process. This may be in response to a user initiating a request to provision a new information system or network service.

As step 403, the provisioning system may provide a provisioning questionnaire 430 to the user in order to gather information about the intended uses of the information system. The provisioning questionnaire 430 may include a process baseline questionnaire 431 and/or process classification questionnaire 433. These questionnaires may seek to capture the overall goals and purpose of the system. For example, the process classification questionnaire 433 may prompt the user to select a category and/or classification for the desired information system, such as "big data storage" or "transaction processing," as but two examples.

The provisioning questionnaire 430 may further include technical questionnaire 435, which may attempt to capture information relating to available hardware for implementing the information system and/or technical requirements for the information system. For example, the user may be asked to describe characteristics of available servers and/or storage devices. As another example, the user may be allowed to define minimum up-time, speed, reliability, and/or other metrics for the information system.

The provisioning questionnaire 430 may also include a regulatory questionnaire 437 and/or a risk questionnaire 439. The regulatory questionnaire 437 may seek to capture information about rules, regulations, and/or laws that may apply to the information system and/or the information processed by the information system. Examples of regulatory questionnaire 437 segments may include an application target questionnaire, a data classification questionnaire, and/or a disclosure & reporting questionnaire. The risk questionnaire 439 may seek to capture information regarding business and security risks associated with the information system and/or information processed by the information system. Examples of risk questionnaire 439 may include a financial and/or operating risk questionnaire, an organizational security questionnaire, and/or a security configuration questionnaire.

The user's answers to the provisioning questionnaire 430 may be submitted at step 405 and used to generate an initial process map for the information system. The provisioning system may utilize the user's answers to the provisioning questionnaire 430 to determine an information processing task for the information system, as well as to determine any initial entities for inclusion in the initial process map. The provisioning system may refer to an initial process map template database 440 to retrieve a process map template based on the determined information processing task. The process map template may include an initial set of entities and entity relationships generally suitable for the associated information processing task.

The submitted answers may be used by an application connector in combination with the process map template to generate an initial process map for the information system. The process map may be generated based on known tasks and entities associated with the information processing task and/or the user's questionnaire answers. For example, if the user answered during the technical questionnaire that the incoming record data was handled by an Application Programming Interface (API), the provisioning server may include an API entity in the initial process map. Similarly, if the user answers in the risk questionnaire that the data requires managerial approval prior to publication, the provisioning system may include an approval step in the initial process map. The provisioning system may establish initial entity relationships between the entities based on the process map template associated with the information task, the user's responses, and/or one or more attributes of the entities included in the initial process map.

At step 407, the provisioning system may programmatically optimize the initial process map to generate an intermediate process map. As described above, optimization may comprise applying a suitable optimization algorithm to the entities and entity relationships in the initial process map to identify an improved configuration for the process map. Optimization may include removing, adding, and/or adjusting entity relationships or entities and evaluating a candidate process map against one or more optimization criteria. In some implementations, the optimization algorithm may iteratively perturb relationships among the entities in search of a minimal set of entities and/or entity relationships that accomplish a task associated with the process map.

Optimization may include breaking down the process map into one or more sub-processes suitable for individual optimization. The provisioning system may optimize the individual sub-processes and combine optimal sub-processes to generate an optimized process and intermediate process map. In some embodiments, the individual sub-processes may be assigned to one or more worker nodes in the provisioning system for optimization using parallel processing, as illustrated in FIG. 5.

Figure 5:
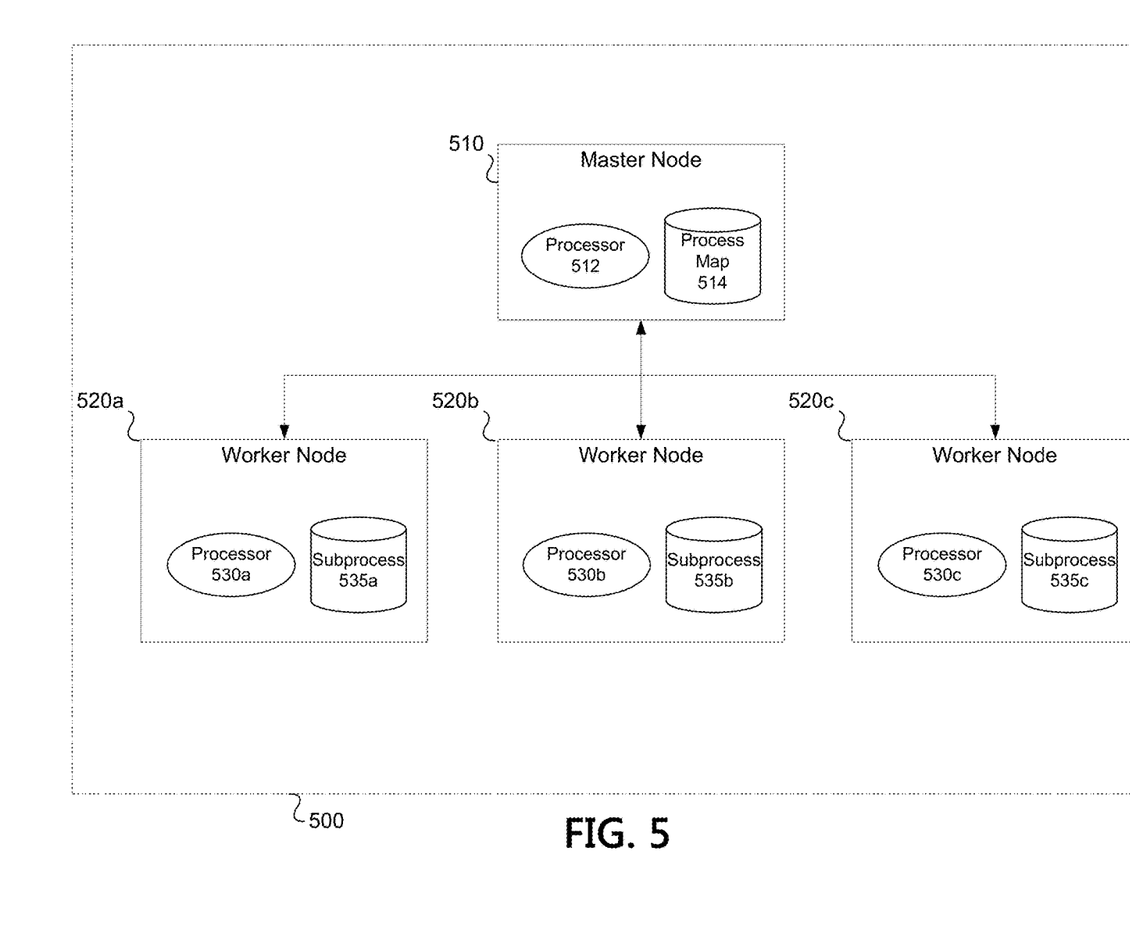
FIG. 5 illustrates an example implementation of an optimization system incorporating multiple computing resources using parallel processing.

FIG. 5 illustrates an example of a parallel system architecture which may be used to implement one or more aspects described herein. In particular, the parallel system architecture may be used to divide optimization tasks across multiple computing devices. As described further above, a provisioning system 500 may break an overall process into one or more sub-processes that may be individually amenable to optimization. Provisioning system 500 may be implemented using a parallel system architecture with one or more worker nodes 520*a-c* (collectively "worker nodes 520") and a master node 510, wherein each worker node 520*a-c* processes a portion of the overall process (a sub-process) under the command of master node 510. Master node 510 and worker nodes 520 may be implemented in one or more computing devices, which may include and/or incorporate one or more processors and one or more memories. In some instances, master node 510 and worker nodes 520*a-c* may include any number of different subsystems, modules, databases, and/or libraries, as appropriate. Although three worker nodes 520*a-c* are illustrated in FIG. 5, it should be understood that provisioning system 500 may be implemented with any number of worker nodes. In some embodiments, there may be more than one master node 510, particularly where the complexity of the analyzed process maps becomes large. In some embodiments, features of the master node 510 may be implemented by one or more of the worker nodes 520 and the master node 510 may be an optional component. Further, the master node 510 may itself implement features of the worker nodes 520, such as itself processing a particular sub-process of the overall process. Many different parallel system architectures are available and it will be understood that aspects described herein may be adapted for use on many disparate parallel systems.

Master node 510 may be configured to determine one or more sub-processes that together make up the overall process. Master node 510 may be configured to orchestrate processing of the individual sub-processes by worker nodes 520. Master node 510 may have one or more processors 512 and may store a process map 514 reflecting the overall process being optimized. In parallel system architectures that do not incorporate a master node, one or more of the worker nodes 520 may store information identifying the overall process.

An individual worker node may receive commands from the master node 510 to perform an operation on a sub-process 535*a-c* stored at the respective individual worker node, and may return a result of the operation to the master node 510 or other node. This operation may be performed in parallel with other individual nodes of the worker nodes 520 and each node may perform the operation concurrently (or at least substantially at the same time, as some nodes may have different processing capabilities and/or some sub-processes may take longer to optimize).

The optimization process performed by each worker node 520 may be implemented using any suitable optimization algorithm adapted to process and optimize process maps as described above. Optimization may involve assessing the suitability of the entities associated with the sub-process and relationships between those entities. Suitable optimization algorithms may generate optimal solutions and/or reasonable approximations of an optimal solution that accomplish a task handled by the process/sub-process (such as where stop criteria and/or confidence levels are used to prevent an exhaustive search). Optimization algorithms may iteratively adjust entity relationships and/or entities in the process map and may evaluate the resulting process maps based on optimization criteria. Examples of criteria for determining an optimal solution may include criteria based on a number of entities in a solution, a number of relationships in a solution, the nature of entities in a solution, the nature of relationships in a solution, the expected processing loads associated with the solution, the expected storage loads associated with the system, level of compliance with policies, and/or any other suitable metric for evaluating the suitability of a solution for implementation. Some optimization algorithms suitable for implementations may determine a minimal number of entities and/or entity relationships for a given process map while still maintaining an intended function of the information system represented by the process map. Some examples of suitable optimization algorithms may include ant colony optimizations which generate partial search algorithms that yield solutions that are sufficient approximations of the ideal solution; simulated annealing algorithms which may determine an optimum for a given function and may operate on discrete data in a large search space; particle swarm optimization algorithms; and metaheuristic algorithms which attempt to find partial search algorithms that provide sufficient quality solutions.

In some embodiments, the worker nodes 520 may continue searching for an optimal solution for their assigned sub-processes until stop criteria is met. The master node 510 may provide suitable stop criteria to each of the worker nodes for use in identifying an optimal solution for each sub-process subject to certain specified constraints and tolerances. For example, the stop criteria may comprise a processing budget that causes the optimization process to stop after a certain amount of processing time and/or computing resources has been utilized by the optimization process. The stop criteria may, as another example, cause the optimization process to be stopped after a set of variations is exhausted. As yet another example, the stop criteria may comprise conditions associated with a particular optimization algorithm selected for a given implementation, such as a confidence rating associated with a metaheuristic problem optimization algorithm. Upon reaching the stop criteria, the master node 510 may receive optimization results from the worker nodes 520 and combine the optimized sub-processes to generate the intermediate process map.

Returning to FIG. 4, at step 409 the provisioning system may apply a master template to the intermediate process map generated in step 407. The master template may include information about best practices, standards, and/or regulations. As part of applying the master template to the process map, the optimization system may generate one or more recommendations regarding steps, entities, relationships, and/or other aspects of the process that may be changed to comply with best practices, standards, policies, regulations, and the like. For example, risk management aspects of the master template may mandate that a periodic risk audit step be added to a portion of the process. As another example, the technical standards may suggest that a separate encryption step is unnecessary where a database structure itself provides encryption.

Application of the master template may involve reference to numerous data sources and governing entities regarding technical, regulatory, and risk management best practices. The master template may also incorporate machine learning techniques by utilizing results from prior operations. Additional details of the application of the master template to the intermediate process map are illustrated in FIG. 6.

Figure 6:
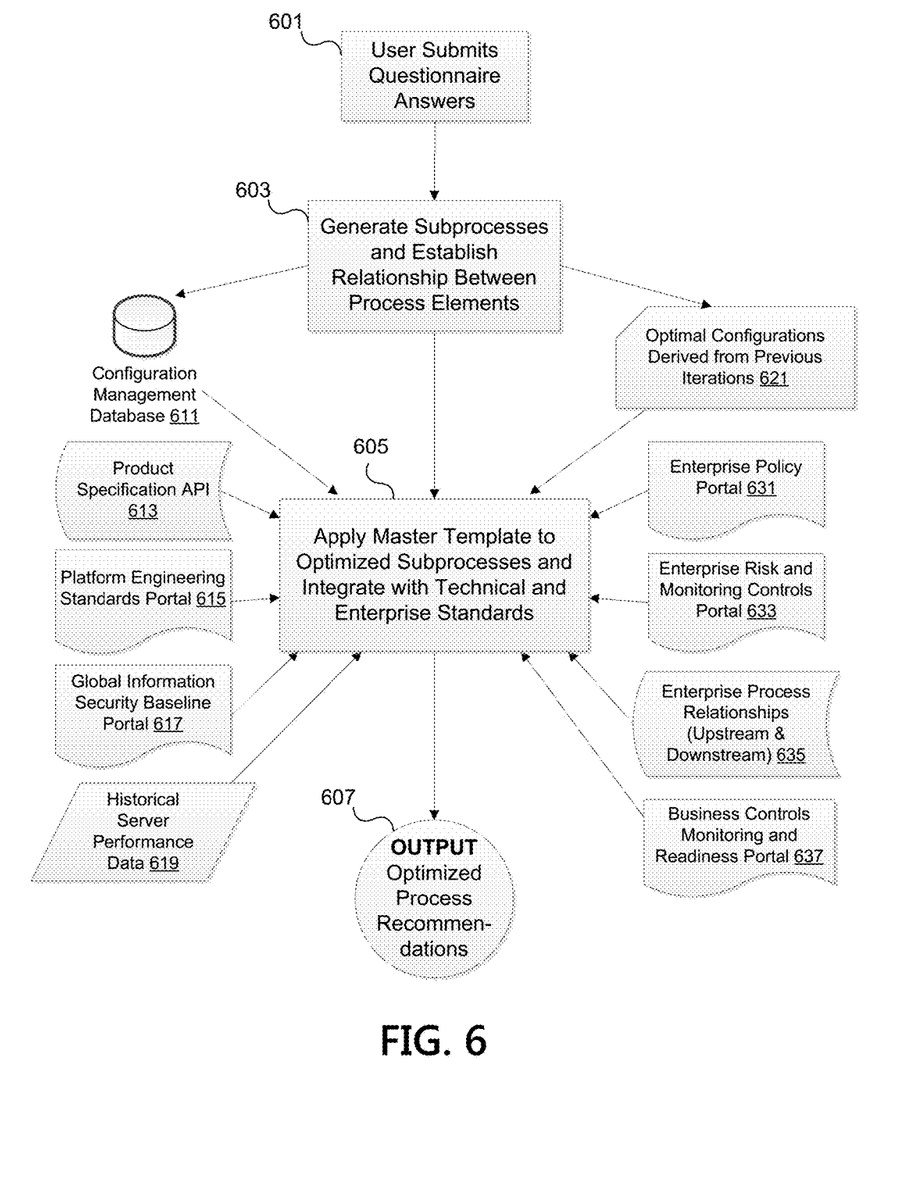
FIG. 6 illustrates another example process optimization workflow according to some aspects described herein.

FIG. 6 illustrates steps that may be involved in applying a master template to an intermediate process map to generate recommendations for modifications to the intermediate process map. At step 601, the user may submit answers to the provisioning questionnaire as in steps 401-405 of FIG. 4. At step 603, the provisioning system may generate an initial process map, divide the initial process map into subprocesses, and generate an intermediate process map based on problem optimization algorithms that identify a minimal set of entities and entity relationships for the process map as described above with respect to steps 405-407 of FIG. 4.

At step 605, which may correspond to step 409 of FIG. 4, the provisioning system may apply a master template to the optimized sub-processes in the intermediate process map. Applying the master template may integrate features associated with technical and enterprise standards into the process map for implementation in the information system.

Application of the master template may be informed from a wide range of data sources providing information about best practices, policies, technical standards, regulations, and the like. For example, the master template may be generated based on a product specification application programming interface (API) 613 that provides product specifications associated with entities included in the intermediate process map. As another example, the master template may be generated based on platform engineering standards portal 615, which may provide information regarding technical standards associated with a platform utilized by the information system represented by the process map. As yet another example, the master template may be generated based on global information security baseline portal 617, which may provide minimum information security requirements for information systems. As another example, the master template may be generated based on enterprise policy portal 631, which may provide information regarding one or more enterprise policies for compliance by the information system. As another example, the master template may be generated based on enterprise risk and monitoring controls portal 633, which may provide information related to risk and monitoring controls associated with the enterprise and suggested/required for implementation in the information system. As still another example, the master template may be generated based on enterprise process relationships portal 635, which may include information regarding relationships between upstream and downstream processes within the enterprise. As another example, the master template may be generated based on business controls monitoring and readiness portal 637, which may include information related to business controls monitoring within the enterprise.

The master template may be further informed by a configuration management database 611. The configuration management database 611 may provide information associated with configurations of hardware, software, and/or user entities and may be used to confirm and/or ensure that a configuration represented by the process map meets configuration requirements. For example, the configuration management database may indicate that a data warehouse requires input in a particular format and may be used to identify a recommendation that data of a different format be translated into the particular format before being provided to the data warehouse.

The master template may further incorporate machine learning features based on optimal configuration derived from previous operation of the provisioning system 621. For example, the provisioning system may store optimized configurations determined during generation of other intermediate process maps and/or through applications of master templates to other information systems. This information may be used via machine learning techniques to further improve the recommendations generated by the provisioning system when applying the master template. As another example, the master template may incorporate historical server performance data 619 and may similarly utilize this data to better determine recommendations for modifications to the intermediate process map.

Through reference to one or more of these portals, databases, and APIs, the provisioning system may determine recommendations regarding adding, removing, or modifying entities and/or entity relationships in the intermediate process map. The provisioning system may provide recommendations designed to comply with the various policies, standards, and requirements imposed by the governing portals.

The optimized process recommendations, generated based on application of the master template, may be output at step 607 (for example in the form of another process map incorporating the recommendations).

Returning to FIG. 4, at step 411 the provisioning system may provide a user with the optimization recommendations generated via application of the master template to the intermediate process map. The user may be prompted to select one or more of the optimization recommendations for inclusion in the final optimized process map. In some embodiments, all recommendations may be accepted by default and the user may be provided an opportunity to reject recommendations. In some implementations, information associated with the master template may indicate that a particular optimization recommendation is required for compliance with technical, enterprise, security, risk, or other policy/standard. Required optimizations may be implemented by default, thereby facilitating compliance with relevant policies and standards. Users may also be allowed to manually adjust any aspect of the process map, such as entities, entity relationships, attributes of entities or relationships, and the like.

At step 413, the provisioning system may implement the recommendations as selected by the user or as required by enterprise standards/policies, thereby generating a final optimized process map corresponding to a configuration for the information system desired by the user. At step 415, the final optimized process map may be provided for review and sign-off by an application owner and/or a process owner.

At step 417, the approved optimized process map may be provided to an automated orchestration system for implementation. The automated orchestrator may rack, stack, build, and deploy the information system as represented by the process map. For example, the automated orchestrator may identify suitable resources in a pool of available resources and configure those resources for use in implementing the information system.

Figure 7A:
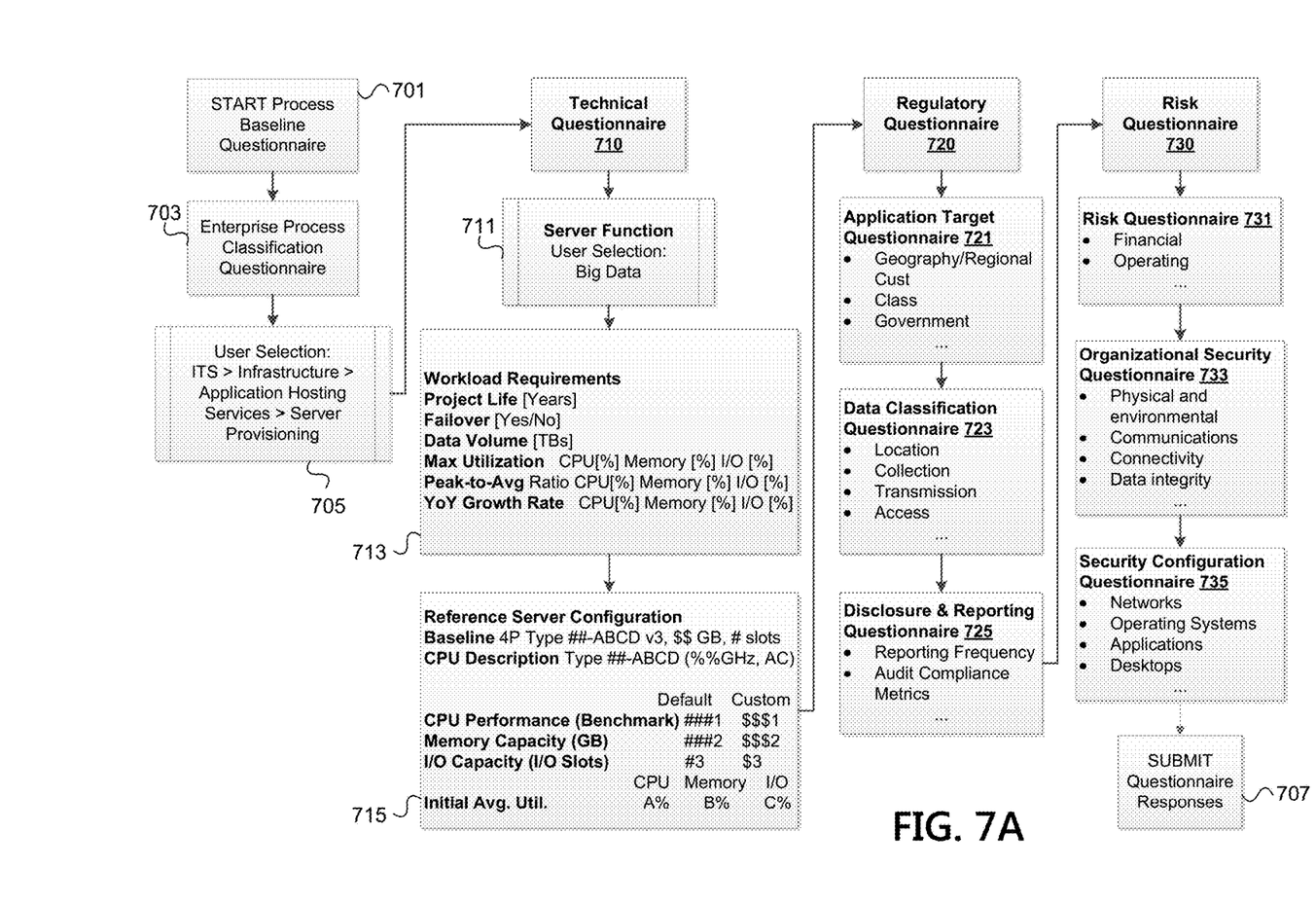
FIGS. 7A and 7B illustrate an example application of a process optimization workflow according to some aspects described herein.
Figure 7B:
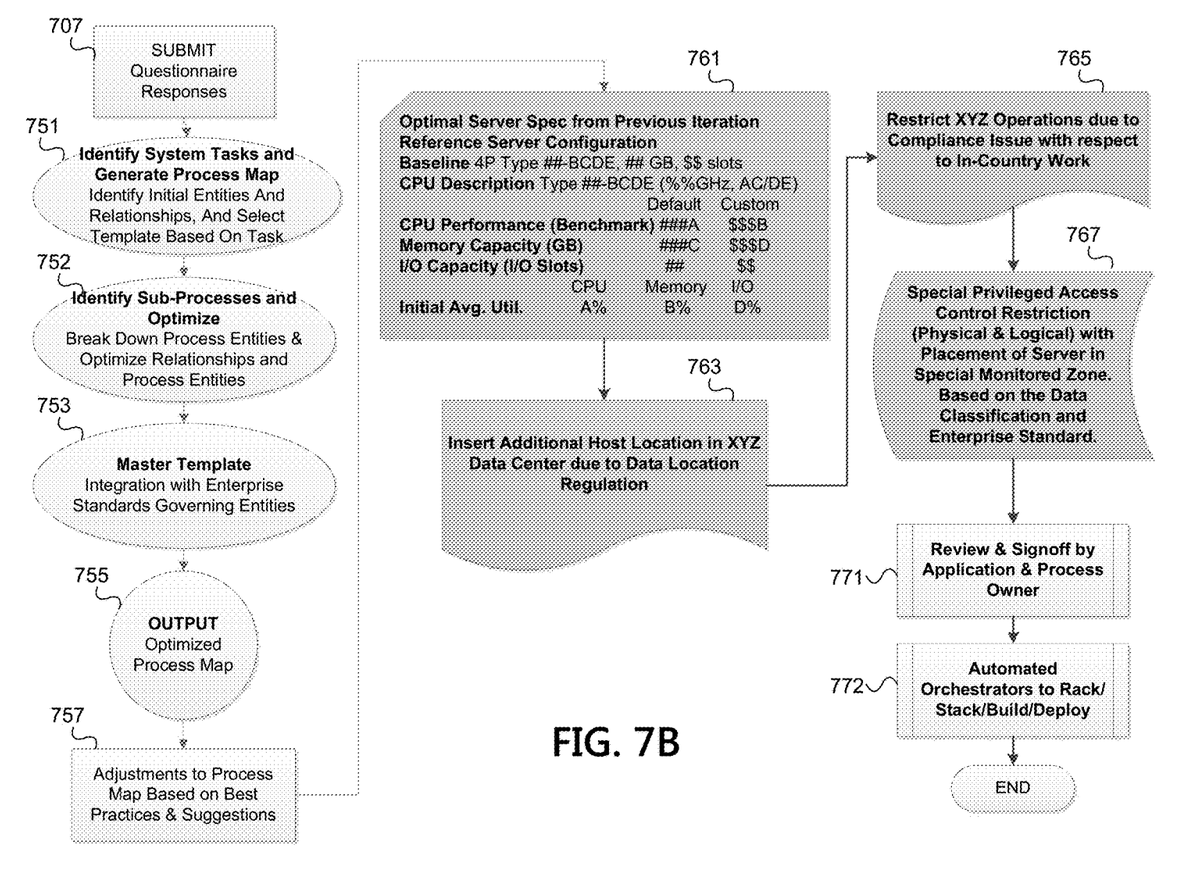

Having described an example process flow for generating an optimized process map for a desired information system, discussion will now turn to an example process questionnaire and associated processing as illustrated in FIGS. 7A-7B.

FIG. 7A illustrates a first portion of a process flow and sample questionnaire according to aspects described herein. At step 701, a provisioning system may initiate a process baseline questionnaire in response to a user request to generate a configuration for an information system. At step 703, the provisioning system may present the user with an enterprise process classification questionnaire, which may request that the user answer questions about the broader goals for the information system. At step 705 the user may select a particular classification/goal for the information system, in the example of FIG. 7A the user may select "Information Technology Services>Infrastructure>Application Hosting Services>Server Provisioning." This example selection may correspond to a user desire to design an information system to build an application server.

At step 710, the provisioning system may present the user with a technical questionnaire. The content of user prompts and questions presented to the user may be selected by the provisioning system based on the selected process class or task. As the user provides further responses, the prompts may dynamically branch to ask for additional information about the information system based on prior responses. For example, the technical questionnaire may begin with a question about the purpose of the application server due to the prior response indicating that the class for the information system was Server Provisioning. In response to a prompt 711 regarding the function of the application server, the user may select "Big Data." Based on the user selection of big data, the provisioning system may present the user with prompts 713 and 715 regarding workload requirements and reference servers for use in configuring the application server.

At step 720, the provisioning system may proceed to present the user with a regulatory questionnaire regarding regulations and applicable laws associated with an information processing task for the information system. The provisioning system may provide an application target questionnaire 721 which may include user prompts associated with the geography/regionality of customers of the information system, classifications associated with the customers, government use, and the like. The provisioning system may further provide a data classification questionnaire 723 to the user with questions about the location for storing data, methods of collections and transmission, and user access to the data (for example). The provisioning system may also provide a disclosure and reporting questionnaire 725 to the user regarding reporting frequency, audit and compliance metrics, and the like.

At step 730, the provisioning system may provide the user with a risk questionnaire. A first risk questionnaire 731 may include prompts relating to financial risks, operating risks, and the like. An organizational security questionnaire 733 may include questions regarding physical and environmental security, communications security, connectivity requirements and risks, data integrity, and the like. A security configuration questionnaire 735 may include prompts relating to network configurations, operating systems, applications, desktop configurations, and the like.

At step 707, the user may submit the responses to the questionnaire and the provisioning system may proceed to determine a process map associated with the information system as further illustrated in FIG. 7B.

FIG. 7B illustrates a second portion of the process flow illustrated in FIG. 7A. At step 751, the provisioning system may determine an information processing task for the system and generate an initial process map based on a process map template, as described above with respect to step 405 of FIG. 4. At step 752, the provisioning system may optimize the initial process map to generate an intermediate process map as in step 407 of FIG. 4. At step 753, the provisioning system may apply a master template and generate recommendations as in step 409 of FIG. 4.

At step 755, the system may generate output for review by a user regarding recommended modifications to the intermediate process map. At step 757 the user may review a presentation of the recommended changes relative to the process map, such as through a user interface generated by the provisioning system. The provisioning system may, for example, provide a recommendation 761 comprising an optimal server specification determined from a prior instance where the provisioning system optimized a different application server. The system may also recommend 763 that an additional host location in a particular data center be added due to data location regulations. The provisioning system may provide a further recommendation 765 that operations in a particular region be restricted based on regional regulations and the particular features utilized in the information system. As another recommendation 767, the provisioning system may recommend that special privileged access control restrictions be imposed through placement of server in a monitored zone based on standards and policies indicated in data classification or enterprise standard platforms.

At step 771, an application owner and/or process owner may review and approve the recommendations and the provisioning system may generate a final approved process map incorporating the approved recommendations. At step 772, the approved process map may be provided to an automated orchestrator which may rack, stack, build, and deploy the information system represented in the process map.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A network service provisioning system comprising:
one or more processors; and
memory storing instructions that, when executed by the one or more processors, cause the network service provisioning system to:
generate a user interface comprising a plurality of dynamically branching user prompts, wherein the dynamically branching user prompts request information associated with operation and configuration of an information system;
determine an information processing task for the information system based on a plurality of responses to the plurality of dynamically branching user prompts;
generate an initial process map comprising a first plurality of entities and a first plurality of entity relationships based on the plurality of responses and the information processing task;
determine a plurality of sub-processes associated with the initial process map, wherein each sub-process of the plurality of sub-processes is associated with one or more entities of the first plurality of entities;
generate an intermediate process map comprising a second plurality of entities and a second plurality of entity relationships based on optimizing each sub-process of the plurality of sub-processes;
apply a master template to the intermediate process map to generate a set of optimization recommendations, wherein the master template incorporates constraints and standards associated with the information processing task and the plurality of responses;
generate an optimized process map comprising a third plurality of entities and a third plurality of entity relationships based on user input selecting one or more optimization recommendations from the set of optimization recommendations and the intermediate process map; and
provide the optimized process map to an automated orchestrator for implementation and configuration of the information system.

2. The network service provisioning system of claim 1, wherein the network service provisioning system further comprises an initial template database associating each of a plurality of information processing tasks with a respective initial template, and wherein generating the initial process map is based on a corresponding initial template associated with the determined information processing task.

3. The network service provisioning system of claim 1, wherein the network service provisioning system comprises at least one master node and at least one worker node, and wherein optimizing each sub-process of the plurality of sub-processes comprises:
distributing, by the master node, one or more sub-processes of the plurality of sub-processes to the at least one worker node; and
receiving, by the master node, an optimization result from the at least one worker node for the one or more sub-processes.

4. The network service provisioning system of claim 3, wherein the at least one worker node comprises a plurality of worker nodes, and wherein optimizing each sub-process of the plurality of sub-processes is performed using parallel processing on the plurality of worker nodes.

5. The network service provisioning system of claim 1, wherein optimizing each sub-process of the plurality of sub-processes comprises iteratively adjusting relationships between the one or more entities associated with a given sub-process until an optimum solution is discovered.

6. The network service provisioning system of claim 1, wherein optimizing each sub-process of the plurality of sub-processes comprises identifying redundancies in a given sub-process and removing the identified redundancies from the given sub-process.

7. The network service provisioning system of claim 1, wherein the master template is based on optimal configurations and recommendations generated during previous operation of the network service provisioning system.

8. The network service provisioning system of claim 1, wherein the constraints and standards incorporated in the master template are based on at least one of: enterprise policies, product specifications, platform engineering standards, historical performance information, and process monitoring controls.

9. The network service provisioning system of claim 1, wherein the first plurality of entities comprises at least one hardware system.

10. The network service provisioning system of claim 1, wherein the dynamically branching user prompts comprise at least one of a technical questionnaire, a regulatory questionnaire, and a risk questionnaire.

11. A method for configuring an information system, the method comprising:
generating, by a provisioning server, a user interface comprising a plurality of dynamically branching user prompts, wherein the dynamically branching user prompts request information associated with operation and configuration of the information system;
determining, by the provisioning server, an information processing task for the information system based on a plurality of responses to the plurality of dynamically branching user prompts;
selecting, by the provisioning server, a first plurality of entities for use in the information system based on the plurality of responses and the information processing task;
generating, by the provisioning server, an initial process map comprising the first plurality of entities and a first plurality of entity relationships based on the plurality of responses and the information processing task;
determining, by the provisioning server, a plurality of sub-processes associated with the initial process map, wherein each sub-process of the plurality of sub-processes is associated with one or more entities of the first plurality of entities;
generating, by the provisioning server, an intermediate process map comprising a second plurality of entities and a second plurality of entity relationships based on optimizing each sub-process of the plurality of sub-processes;
applying, by the provisioning server, a master template to the intermediate process map to generate a set of optimization recommendations, wherein the master template incorporates constraints and standards associated with the information processing task and the plurality of responses;
receiving, by the provisioning server, user input selecting one or more recommendations of the set of optimization recommendations for implementation;
generating, by the provisioning server, an optimized process map comprising a third plurality of entities and a third plurality of entity relationships based on the selected one or more recommendations and the intermediate process map; and
providing, by the provisioning server, the optimized process map to an automated orchestrator for implementation and configuration of the information system.

12. The method of claim 11, wherein the provisioning server comprises an initial template database associating each of a plurality of information processing tasks with a respective initial template, and wherein generating the initial process map is based on a corresponding initial template associated with the determined information processing task.

13. The method of claim 11, wherein the provisioning server comprises at least one master node and at least one worker node, and wherein optimizing each sub-process of the plurality of sub-processes comprises:
distributing, by the master node, one or more sub-processes of the plurality of sub-processes to the at least one worker node; and
receiving, by the master node, an optimization result from the at least one worker node for the one or more sub-processes.

14. The method of claim 13, wherein:
the master node comprises a first processor and a first memory,
the worker node comprises a second processor and a second memory, and
the master node and the worker node are each distinct hardware systems in communication via a network.

15. The method of claim 13, wherein the at least one worker node comprises a plurality of worker nodes, and wherein optimizing each sub-process of the plurality of sub-processes is performed using parallel processing on the plurality of worker nodes.

16. The method of claim 11, wherein optimizing each sub-process of the plurality of sub-processes comprises iteratively adjusting relationships between the one or more entities associated with a given sub-process until an optimum solution is discovered.

17. The method of claim 11, wherein optimizing each sub-process of the plurality of sub-processes comprises identifying redundancies in a given sub-process and removing the identified redundancies from the given sub-process.

18. A non-transitory computer-readable medium storing instructions that, when executed by a processor, cause a provisioning system to:
generate a first user interface comprising a plurality of dynamically branching user prompts, wherein the dynamically branching user prompts request information associated with operation and configuration of an information system;
determine an information processing task for the information system based on a plurality of responses to the plurality of dynamically branching user prompts;
generate an initial process map comprising a first plurality of entities and a first plurality of entity relationships based on the plurality of responses and the information processing task;
determine a plurality of sub-processes associated with the initial process map, wherein each sub-process of the plurality of sub-processes is associated with one or more entities of the first plurality of entities;
generate an intermediate process map comprising a second plurality of entities and a second plurality of entity relationships based on optimizing each sub-process of the plurality of sub-processes, wherein optimizing each sub-process of the plurality of sub-processes comprises:
  distributing, by the provisioning system, one or more sub-processes of the plurality of sub-processes to a plurality of worker nodes; and
  receiving, by the provisioning system, an optimization result from the plurality of worker nodes for the one or more sub-processes;
apply a master template to the intermediate process map to generate a set of optimization recommendations, wherein the master template incorporates constraints and standards associated with the information processing task and the plurality of responses;
generate an optimized process map comprising a third plurality of entities and a third plurality of entity relationships based on user input selecting one or more optimization recommendations from the set of optimization recommendations and the intermediate process map; and
present the optimized process map via a second user interface.

19. The non-transitory computer-readable medium of claim 18, wherein the provisioning system comprises an initial template database associating each of a plurality of information processing tasks with a respective initial template, and wherein generating the initial process map is based on a corresponding initial template associated with the determined information processing task.

20. The non-transitory computer-readable medium of claim 18, wherein the master template is based on optimal configurations and recommendations generated during previous operation of the provisioning system.

* * * * *